UNITED STATES PATENT OFFICE.

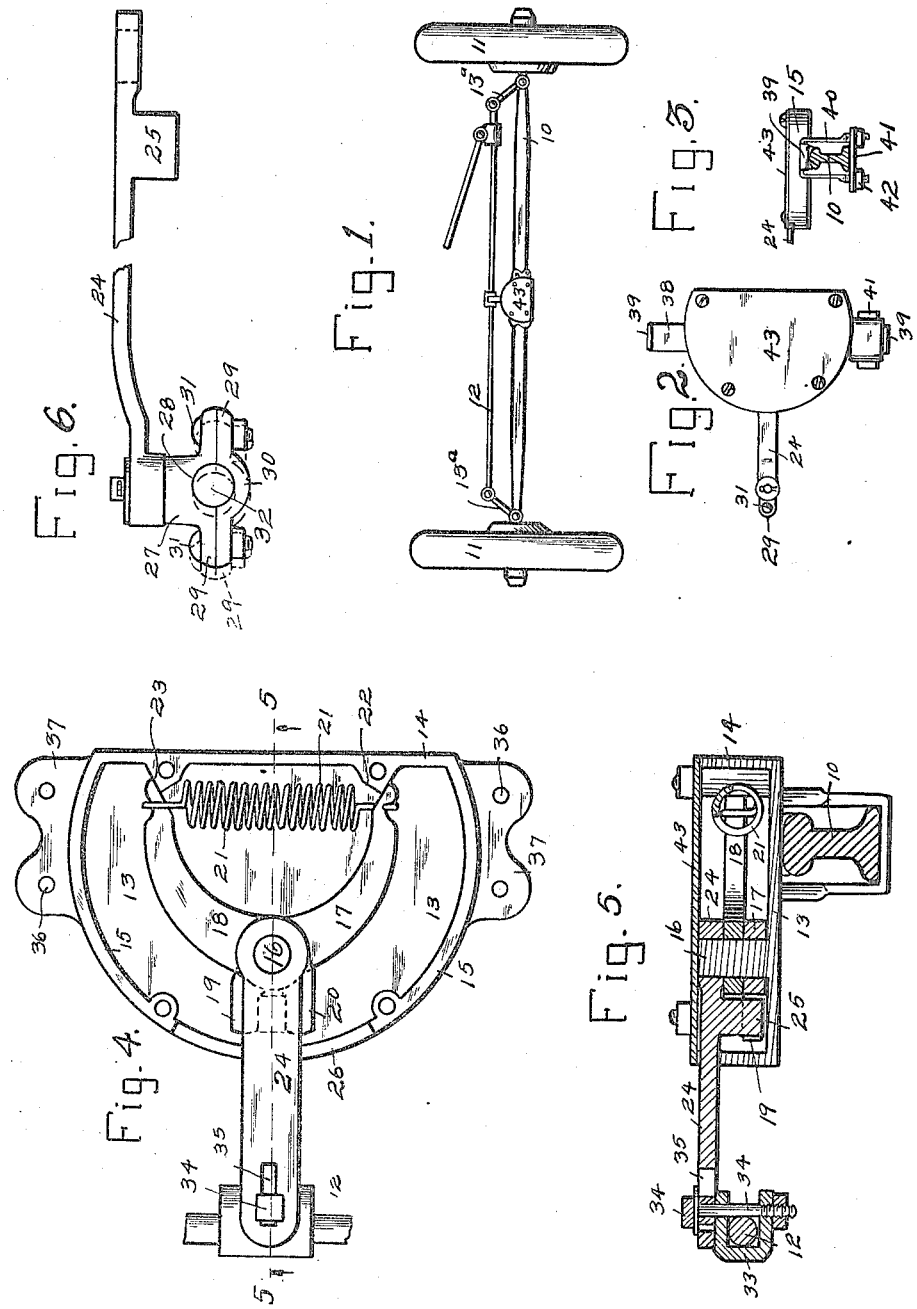

GEORGE P. RASCK AND ALFRED G. RASCK, OF DES MOINES, IOWA; SAID ALFRED G. RASCK ASSIGNOR TO SAID GEORGE P. RASCK.

ATTACHMENT FOR STEERING-GEARS.

1,196,284.  Specification of Letters Patent.  Patented Aug. 29, 1916.

Application filed July 26, 1915. Serial No. 42,081.

*To all whom it may concern:*

Be it known that we, GEORGE P. RASCK and ALFRED G. RASCK, citizens of the United States, and residents of Des Moines, in the county of Polk and State of Iowa, have invented a certain new and useful Attachment for Steering-Gears, of which the following is a specification.

The object of our invention is to provide an attachment for steering gears, whereby any shock imparted to the wheels is cushioned and reduced and prevented from reaching the steering post and steering wheel.

A further object it to provide a device of this type which can be readily and quickly attached to or detached from certain types of motor vehicles, and when in use may be employed to prevent vibration and quick movement of the steering wheel due to obstruction met by the front wheels of the vehicle.

It is our further object to provide such a device so constructed and arranged as to yieldably hold the steering rod in such position that the front wheels of the vehicle will be operated straight forward.

A further object is to provide mechanism of new and peculiar construction for accomplishing the last purpose, and so constructed and arranged that the tension may be increased for imparting greater pressure for moving the parts to normal position the farther they are away from such normal position.

Our invention consists in the construction, arrangement and combination of the various parts of the device whereby the objects contemplated are attained, as hereinafter more fully set forth, pointed out in our claims and illustrated in the accompanying drawings, in which:

Figure 1 shows a top or plan view of the front wheels and axle of a motor vehicle together with a part of the steering mechanism equipped with an attachment for steering gears embodying our invention. Fig. 2 shows a plan view of the device showing one method of securing the casing to the axle. Fig. 3 shows an end elevation of the device shown in Fig. 2, the axle being shown in section. Fig. 4 shows a top or plan view of our improved attachment, the cover plate of the casing being removed. Fig. 5 shows a vertical sectional view through the mechanism shown in Fig. 4, and Fig. 6 shows a side elevation of a slightly modified form of the mechanism for attaching the device to the steering rod.

In the accompanying drawings, we have employed the reference numeral 10 to indicate generally the front axle of a vehicle, the ends of which are pivoted to stub axles on which are mounted the wheels 11. Just rearwardly of the axle 10 is a steering rod 12 connected by links 13$^a$ with the stub axles in the ordinary way.

Our improved attachment comprises a support, which may have a great variety of forms. As shown in the drawings, it comprises a casing or receptacle having the bottom 13, the forward wall member 14 and the curved wall member 15.

Suitably located on the supporting member 13 is an upwardly extending pin. Pivotally mounted to swing on the pin 16 are two small levers having the forwardly spaced arms 17 and 18, and the rearwardly extending spaced arms 19 and 20. It will be noted that the arm 17 is pivoted below the arm 18 and that the levers cross each other at the pivotal point thereof, so that the lever 17 is on one side of a line drawn through the pin longitudinally of the machine, and the arm 19 is on the other side thereof, while the arm 20 is on the same side of said line as the arm 17 and the arm 18 is on the same side of said line as the arm 19.

The forwardly extending portions of the arms 18 and 17 are connected by a powerful coil spring 21. Formed on the wall 14 are stops 22 and 23, which limit the movement of the arms 17 and 18 toward each other.

Pivoted to the pin 16 above the arms 17 and 18, is a rearwardly extending arm 24 having on its lower portion a downwardly extending lug 25 extending into the space between the arms 19 and 20.

The wall 15 is provided with a longitudinal slot 26 to permit free play of the arm 24. At the rear end of the arm 24 there is provided means for securing said arm 24 to the steering rod 12.

In Figs. 4 and 6 we have shown two forms of said means. In Fig. 6, there is pivoted in the outer end of the arm 24 a downwardly extending member 27 forming the upper half of a bearing 28, and having on each side thereof flanges 29. Secured to the member 27 is the lower bearing member 30 having the flanges 29 adapted to engage the flanges 29 of the member 27 and to be secured thereto by means of bolts 31. The opening 32 formed between the members 28 and 30 is slightly off center with relation to the vertical center of the pivotal point of the member 27. The object of this arrangement of the opening 32 will be hereinafter explained.

In Figs. 4 and 5, we have shown a slightly different form of the mechanism for securing the arm 24 to the steering rod 12, comprising a forwardly opening U-shaped yoke 33, through the arms of which is extended a bolt 34. The bolt 34 extends through a longitudinal slot 35 in the arm 24. It will be seen that by loosening the nut from the bolt 34, such bolt may be changed longitudinally of the arm 24 for varying the position of the U-shaped yoke. The U-shaped yoke 33 is placed over the rod 12 before the bolt is inserted through its arms.

The support 13 may be secured to the axle by means of suitable bolts extended through openings 36 in the flanges 37, or said support may be provided with opposite laterally extending members 38 having slightly upturned portions 39 at their ends.

The portions 38 may be secured to the axle by means of downwardly opening U-shaped yokes 40 extended over the axle 10 and secured together at their lower ends by means of a plate 41 placed over said lower ends, and ordinary nuts 42.

It is well known that the distance from the axle 10 to the steering rod 12 varies slightly in different machines, and we have placed the opening 32 off center with relation to the pivot, so that by rotating the member 28, the bearing opening may be located at different distances from the support 13. In the form of the device shown in Fig. 4, we have provided a longitudinal slot 35 for allowing for variation in distance between axle and steering rod in assembling and installing our improved attachment on a motor car.

The main casing or support, when in use, is protected by the cover member 43, whereby the working parts are protected from dirt and water.

It is well known that on some cars, for instance the Ford, that there is considerable vibration and jar as well as tendency to turn on the part of the steering wheel, due to obstructions etc., encountered by the front wheels of the vehicle. This tendency to turn can almost be entirely prevented by the use of our improved attachment.

In our attachment the casing or support is fastened to the axle, and the arm 24 is secured to the steering rod. It will be seen that if the steering wheel is turned for moving the steering rod 12 longitudinally, for instance toward the right, as shown in Fig. 1, the portion 25 will engage the arm 19, thereby swinging the arm 17 away from the stop 22. On account of the fact that the stop 23 engages the arm 18, the spring 21 is expanded, and the farther the rod 12 is moved to the right, the greater is the tension on the spring 21, and the greater is the tendency to spring the rod 12 back to central position, where the wheels 11 are held in position to move straight forward. However, the tension is not increased in proportion to the movement of the arm 24 for the reason that the moving end of the spring travels on a circle around the pivot part 16 and not directly away from the fixed end of the springs.

The parts of our improved attachment are of extremely simple and inexpensive construction, and the whole device may be quickly and easily attached on a great variety of cars without any change in the construction of the cars or their steering mechanism.

The spring and lever mechanism are inclosed in a suitable casing which protects them from dirt and water.

It will be understood that some changes may be made in the construction, and arrangement of the parts of our improved device without departing from its essential features and purposes, and it is our intention to cover by this application any such changes which may be included within the scope of our claims.

We claim as our invention:

1. In a device of the class described, a support, a pivot member thereon, a pair of levers pivoted on said pivot member having forwardly extending and rearwardly extending arms, a spring secured to each of the forwardly extending arms tending to draw them together, an arm pivoted on said pivot member, means on said arm for engaging the rearwardly extending arms of the levers for selectively moving the forwardly extending arms of the levers for increasing the tension on said spring, and means for limiting the movement of each lever in one direction.

2. In a device of the class described, a support, a pivot member thereon, a pair of levers pivoted on said pivot member, said levers being crossed and each having a forwardly and rearwardly extending arm, a spring secured to the forwardly extending arms, tending to draw them together, means for limiting the movement of said forwardly extending arms toward each other, and means adapted to be connected with the steering rod of a vehicle for moving said forwardly extending lever arms away from each other.

3. In a device of the class described, a support, a pivot member thereon, a pair of levers pivoted on said pivot member, having forwardly extending and rearwardly extending arms, means for limiting the movement of each lever in one direction, means tending to yieldingly move said levers in another direction, an arm pivoted on said pivot member, means on said arm for engaging said levers for selectively moving them for increasing the tension on said yielding means.

Des Moines, Iowa, July 19, 1915.

GEORGE P. RASCK.
ALFRED G. RASCK.

Witnesses:
J. MAHER,
A. G. HOGUE.